Figure 1:
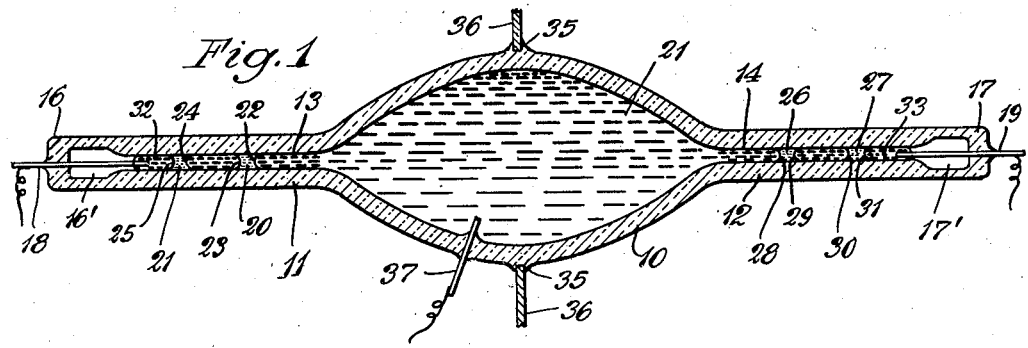

Sept. 10, 1946.  W. H. BUSSEY  2,407,363
ELECTRICAL APPARATUS
Filed Feb. 17, 1945

Inventor
William H. Bussey
by Robert L. Kahn
Attorney.

Patented Sept. 10, 1946

2,407,363

UNITED STATES PATENT OFFICE 2,407,363

ELECTRICAL APPARATUS

William H. Bussey, Chicago, Ill., assignor, by mesne assignments, to Oliver W. Storey, Wheaton, Ill., as trustee for the partnership of O. W. Storey & Associates, Chicago, Ill.

Application February 17, 1945, Serial No. 578,496

7 Claims. (Cl. 171—327)

This invention relates to an electrical apparatus and more particularly to an inertia type of transducer. In the co-pending application Ser. No. 573,913, filed January 22, 1945, there is disclosed a transducer operating on a capillary electrometer principle. A capillary electrometer, in its most general form, comprises mercury and a suitable electrolyte forming an interface in a restricted space. The restricted space is conveniently formed by an insulating tube, such as glass, shaped to provide a capillary channel. It has been found that such an interface tends to move or change its shape in response to a suitable electric potential impressed across it or will generate a suitable potential when such interface is changed or moved.

An electrometer of this type must be operated below a predetermined threshold voltage, generally about the order of one-half volt for an interface of mercury and dilute sulphuric acid. In order to increase the effective threshold voltage, it is possible to separate the interface forming liquids into discrete globules forming a series of cascaded interfaces. By forming an even number of such interfaces, it is possible to reduce the amount of electrolyte used to a minimum and terminate the liquid bodies of the system with mercury. This has a decided advantage in that the electrical resistance of the system is reduced.

Mercury or some mercury alloy in liquid form constitutes one of the interface forming liquids. The other may be an electrolyte such as about ten per cent sulphuric acid or may consist of any one of a large number of compounds. In any event, the specific gravity of the mercury will always be substantially greater than that of the electrolyte used. In addition to this, since the electrical resistance of practically all electrolytes will be substantially greater than that of mercury, it is clear that, in general, it may be desirable to have mercury as the major component of the interface forming liquids. Thus, a substantial quantity of mercury in comparison to the total quantity of liquid in the system will generally be desirable. Unless the quantity of liquid in the system is kept to a low value, it follows that the inertia of the mercury as a movable element will be a substantial part of the entire inertia of the transducer. By virtue of the invention herein described, advantage is taken of this fact, and the inertia of the mercury is utilized for transducer action.

In general, the invention contemplates a capillary type of electrometer wherein the vibratory energy to be transduced is communicated to the electrometer container or chamber, and reliance is placed upon the inertia of some liquid such as mercury for transducer action.

Figure 2:
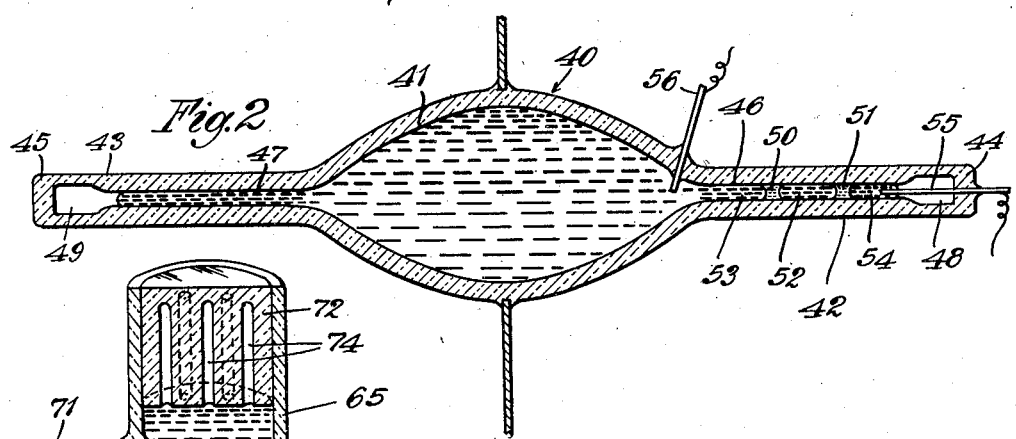
Figure 3:
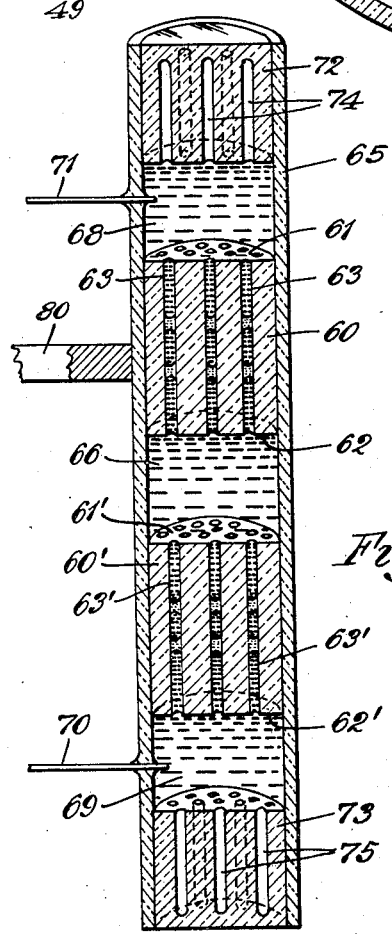

Referring to the drawing, Figure 1 is a side elevation of one form of the invention. Figure 2 is a side elevation of a modified form of the invention, and Figure 3 is an elevation of a further modification.

The invention in general contemplates a capillary electrometer including a container adapted to move relatively to the liquid contents thereof. There is provided a liquid body in part of said container having sufficient mass, in comparison to the rest of the transducer system, so that most of the inertia of the system is concentrated there. Compliant means between container and liquids in the container are provided so that the contents and container will tend to resume a predetermined relative position.

Referring to Figure 1, there is provided a container having main chamber 10 of insulating material with tubular branches 11 and 12. Branches 11 and 12 are preferably parallel and collinear and have channels 13 and 14 therein. Channels 13 and 14 are of capillary dimensions and may vary in diameter from about fifty microns up to as much as one millimeter and even more. The precise size and shape of the capillary may vary within wide limits. It has been found that too fine a capillary may cause undesirable secondary effects while an excessively coarse capillary lacks sensitivity. The length of branches 11 and 12 may vary widely though, in general, lengths of between one quarter and three quarters of an inch may be used. Branches 11 and 12 have end portions 16 and 17 in which are sealed lead-in wires 18 and 19 of platinum or other suitable metal. It is understood that ends 16 and 17 are hermetically sealed. Thus, each branch has a dead end and has a capillary portion therein.

Disposed within chamber 10 is a quantity of liquid mercury 21, said mercury extending into capillary passages 13 and 14 in side branches 11 and 12 respectively.

As shown here, one of the interface forming liquids, i. e. mercury, is utilized as the liquid mass in chamber 10. Thus, the main body of mercury is relied upon both for its inertia and also as an element in the electrometer within the capillary portions of the side branches. It is possible to have some other liquid in chamber 10 and use a small amount of mercury in the branches necessary for electrometer operation. In such case, polarizing potentials and leads to the mercury will have to be considered.

At suitable places in the capillary passages, drops of electrolyte (here shown as two) 20 and 21 are disposed to form interfaces 22 to 25 inclusive in capillary passage 13 and drops 26 and 27 to form interfaces 28 to 31 inclusive in capillary passage 14. Beyond interfaces 25 and 31, mercury 32 and 33 may be disposed.

Ends 16 and 17 have spaces 16' and 17' therein in which are preferably disposed means for imparting compliance to the liquid system. The simplest means consists in permitting air to remain in these spaces, the air being at any desired pressure. However, instead of air, any other gas such as nitrogen, hydrogen, or inert gas or vapor may be used. It is also possible to dispose compressible material in these spaces, such as sponge material. If desired, the container may have a part thereof at ends 16 and 17 of resilient material as a wall portion with or without gas spaces 16' and 17'.

Since the compliance in the system will be one factor in determining the natural frequency of oscillations of the liquids in the system, it will be necessary to control the amount of compliances if the resonant frequency of the system is to be at a desired value.

Chamber 10 may be of any shape and size desired and, as shown, may have a generally ovoid outline. Thus, chamber 10 will have a volume that is substantial in comparison to the volume of capillary passages 13 and 14. In order to communicate motion to or from chamber 10 or any part of the container, coupling region 35 may be provided on chamber 10. This region is preferably in a plane normal to the axis of the capillary passages and, for convenience, may lay in an equatorial plane. Any suitable vibratory load or generator such as diaphragm 36 may be coupled to chamber 10 at region 35. It is understod that leads 18 and 19 will have flexible portions for conducting currents to or from the electrometer during normal operation.

When converting vibratory energy into varying electrical potentials, vibrations of diaphragm 36, or other generator of vibrations, will vibrate the entire container along the axis of the side arms. Thus, if the container is initially moved to the right, it will be equivalent to moving mercury 21 to the left and maintaining the container stationary. The net result will be to create a pressure wave along channel 13 toward sealed end 18. This will tend to move interfaces 22 to 25 left. Similarly, a wave of reduced pressure will be generated in side arm 14, this tending to move interfaces 28 to 31 left toward diaphragm 36. Thus a true push-pull action will result. The above assumes no reflections of pressure waves for simplicity. In case of reflection, the analysis is more complex.

If desired, neutral terminal 37 may be sealed in chamber 10 so that the system may have three terminals.

Conversely, upon application of a potential difference between outside terminals 18 and 19, a push-pull action upon the interfaces will result and cause movement of the container which movement will be communicated to diaphragm 36.

An inertia type of transducer does not necessarily require a push-pull type of device. It is clear that the interfaces in both branches do not necessarily have to be equal and, in fact, the interfaces in one of the branches may be omitted altogether.

Thus, the modified structure shown in Figure 2 discloses container 40 which may preferably have substantially the same shape as the container shown in Figure 1, namely chamber 41 having a generally ovoid shape, and side branches 42 and 43 respectively extending from opposite sides of chamber 41. Side branches 42 and 43 have end portions 44 and 45. Branches 42 and 43 have capillary channels 46 and 47 extending through them between chamber 41 and ends 44 and 45. Ends 44 and 45 preferably have enlarged gas spaces 48 and 49 respectively.

In one side branch such as 42 for example, one or more globules of electrolyte 50 and 51 may be disposed separated by globule 52 of mercury. Mercury 53 and 54 may be disposed at the outer sides of the electrolyte globules.

Mercury 54 extends from capillary channel 46 to gas space 48 and is adapted to have lead 55 sealed in the container wall and extend from the outside through to the mercury. Lead 55 may be of platinum or any other suitable metal. Gas space 48 may vary within the wide limits, but should preferably have a transverse dimension or diameter (if the region has a circular cross section, although this is not essential) of not more than several millimeters. Thus, gas space 48 will retain more or less the capillary characteristics of channel 46. Gas space 48 may have air, some inert gas, or mixture of gases such as hydrogen, nitrogen, argon, carbon dioxide, or any vapor filling at least part thereof. Irrespective of the position of the entire device, the liquid column within capillary 46 will be maintained intact under normal operating conditions and, as long as lead 55 maintains contact with the liquid column in capillary 46, operation is always assured.

Lead 56 may be sealed in container 40 at any point in chamber 41 such as for example at or near the junction of chamber 41 and capillary 46. Within chamber 41, there may be any desirable liquid, either conducting or non-conducting. Thus, if chamber 41 is filled with mercury, lead 56 may be sealed in at any portion of the chamber.

Within capillary 47, there may be either the same liquid as in chamber 41 or a different liquid, and this liquid may extend up to gas space 49. Gas space 49, like space 48, may have any desired gas or vapor, and the gas or vapor contents in either or both gas spaces may be at any desired pressure, either above, equal, or below atmospheric pressure.

It is evident that the container structure is substantially the same as that of the structure shown in Figure 1 with the exception that no lead or no interfaces are provided in connection with capillary 47. Thus, the two gas spaces provide compliance for the system, while the actual transducer action is provided only in one capillary.

As previously pointed out, it is possible to dispose capillary electrometer elements in series to accommodate potentials greater than can be handled by one interface. It is also possible to dispose a plurality of capillary electrometer elements in parallel to increase the electric currents and mechanical force.

Referring now to Figure 3, block 60 may have opposed faces 61 and 62. Block 60 is of insulating material such as glass, Bakelite, polystyrene, or any other material resistant to mercury and the electrolyte used. Block 60 may have any shape desired and, for convenience, is shown as a cylinder with opposed faces 61 and 62 forming the ends thereof. A plurality of capillary passages 63 are disposed longitudinally of the block and extend from one end face to the other end face thereof.

Block 60 may be disposed within and secured to container 65 of any suitable insulating material, block 60 being disposed in such manner as to fill the container channel completely. Thus, capillary passages 63 form the sole liquid paths between faces 61 and 62 within container 65.

If desired, another block 60' similar to block 60 may be disposed in container 65 and spaced from block 60 to form region 66 between the two blocks. As many blocks may be added as desired.

Within the capillary passages in the blocks, there may be disposed as many globules of mercury and electrolyte to form interfaces as may be desired. It is preferred that substantially all passages in one block have an equal number of interfaces. Inasmuch as the electrolyte will, in general, be reduced to a minimum, the number of interfaces will be an even number, and mercury will be the end liquid at the block faces.

Within region 66, a quantity of mercury may be disposed to form both an electrical and mechanical connection between the capillary passages in one block and the capillary passages in the other block.

At the outer faces of the end blocks, in this case 61 and 62', regions 68 and 69 are formed within which regions mercury may be present. Leads 70 and 71 may be sealed into the container from the outside and extend through the wall of the container to mercury in regions 68 and 69. Thus, circuit connections from the outside to the interface forming liquids in the system is assured.

In order to provide compliance within the system, a pair of blocks 72 and 73 may be provided beyond regions 68 and 69. Blocks 72 and 73 are similar in mechanical structure to blocks 60 and 60' in having capillary passages 74 and 75. These passages may extend from regions 68 and 69 as far as desired. The number and size of capillary passages need not be the same as in blocks 60 and 60', and it is not essential that blocks 72 and 73 be of insulating material. Capillary passages 74 and 75 in the two end blocks have air or any inert gas or mixture of gases therein. Capillary forces will prevent mercury in regions 68 and 69 from extending very far into blocks 72 and 73. However, the gas in these blocks may be compressed and may provide any desired compliance at both ends of the system.

The length of the blocks including the blocks having interface forming liquids therein may vary within wide ranges. Thus block 60 and any other additional blocks which may have interface forming liquids therein may range in length from one-quarter of an inch up depending upon the number of interfaces. Blocks 72 and 73 may vary in length, depending upon the amount of compliance desired, the pressure of the gas within the system, and other factors.

Container 65 is preferably sealed around the entire system of blocks. It is possible, however, to leave the outer end face of blocks 72 and 73 open to the atmosphere, since capillary passages in these blocks will maintain the mercury in position. However, upon jarring or excessive vibration, it is possible to lose some mercury and contamination may also occur. It is, therefore, desirable to seal the entire system hermetically. If desired, additional air space beyond blocks 72 and 73 may be provided within container 65 with the capillary passages in these end blocks serving only as a mercury retaining means.

Any suitable means 80 may be attached to container 65 at any desired region for imparting to or receiving from container 65 motion for transducer action.

It is clear that by having substantial masses of liquids at regions 66 and 68, 70 and 71 that the device will function as an inertia type of transducer. If desired, container 65 may be enlarged at these regions so that a greater quantity of liquid is present. This enlargement may be either transverse or longitudinal, or both, of the container.

What is claimed is:

1. A transducer comprising an insulating container having a chamber and a pair of dead-end branches including opposed capillary portions leading from said container and being substantially collinear, mercury and another liquid in said container forming at least one capillary electrometer interface in at least one of said capillary portions with a substantial quantity of mercury in said chamber, electrical connections from the outside of said container to said interface forming liquids, and compliant means at the dead ends of said branches beyond said capillary portions for accommodating relative movement between the liquids and container, said container being adapted to vibrate during normal transducer operation and there being a continuous liquid column between said opposed capillary portions.

2. A transducer comprising an insulating container having a generally ovoid chamber and a pair of opposed dead-end branches including capillary portions leading from the small ends of said container and being substantially collinear, mercury and another liquid in said container forming at least one capillary electrometer interface in each capillary portion with a substantial quantity of mercury in said chamber, electrical connections from the outside of said container to said interface forming liquids, gas spaces at said branch ends providing compliance for accommodating relative movement between the liquids and container, and means disposed on said container for transmitting to or receiving therefrom vibration incident to transducer operation.

3. The structure of claim 2 wherein said electrical connections comprise wires passing through said container at the dead-ends of said branches and a neutral wire through said container at the chamber.

4. A transducer comprising an insulating container having a block of insulating material therein, said block having a plurality of capillary passages therethrough, said block separating said container interior into two regions interconnected solely by said capillary passages, mercury and another liquid in said container forming at least one capillary electrometer interface in each capillary passage with a substantial quantity of mercury in said two regions, electrical connections from the outside of said container to said interface forming liquids, and compliant means comprising capillary gas passages at said regions for accommodating relative movement between the liquids and container, said container being adapted to vibrate during normal transducer operation.

5. The structure of claim 4 wherein each capillary passage has an even number of interfaces with the number of interfaces in all passages being the same.

6. A transducer comprising an insulating container having at least two blocks in spaced relation with said blocks dividing said container into three isolated regions, each block having a plurality of capillary passages therethrough between the regions on opposite sides of said block, mercury and another liquid in said container forming at least one capillary electrometer interface in each capillary passage with a substantial quantity of mercury in each region, electrical connections from the outside of said container to said interface forming liquids, and compliant means comprising capillary gas passages at the end regions for accommodating relative movement between the liquids and container, said container being adapted to vibrate during normal transducer operation.

7. A transducer comprising an insulating container having at least one block therein dividing said container interior into two regions, said block having a plurality of capillary passages connecting said regions, mercury and another liquid in said block passages forming at least one capillary electrometer interface in each passage, a substantial quantity of liquid in said regions contacting said interface forming liquids, electrical connections from the outside of said container to said interface forming liquids, and an additional block in each of said regions, each said additional block having a plurality of capillary passages extending from said regions, said capillary passages containing gas and providing compliance for said system.

WILLIAM H. BUSSEY.